(12) United States Patent  (10) Patent No.: US 7,755,805 B2
Sugeta et al.  (45) Date of Patent: Jul. 13, 2010

(54) IMAGE READING APPARATUS, CONTROL METHOD THEREFOR, AND PROGRAM

(75) Inventors: Mitsuhiro Sugeta, Ibaraki (JP); Kenji Hiromatsu, Chiba (JP)

(73) Assignee: Canon Kabushiki Kaisha (JP)

( * ) Notice: Subject to any disclaimer, the term of this patent is extended or adjusted under 35 U.S.C. 154(b) by 381 days.

(21) Appl. No.: 11/925,206

(22) Filed: Oct. 26, 2007

(65) Prior Publication Data
US 2008/0055676 A1 Mar. 6, 2008

Related U.S. Application Data

(63) Continuation of application No. 10/436,384, filed on May 12, 2003, now Pat. No. 7,327,497.

(30) Foreign Application Priority Data

May 14, 2002 (JP) ............... 2002-139061

(51) Int. Cl.
*H04N 1/04* (2006.01)
*H04N 1/40* (2006.01)
(52) U.S. Cl. ............... 358/461; 358/406; 358/474; 358/496; 358/497
(58) Field of Classification Search ............... 358/461, 358/496, 498, 466, 465, 497, 406, 504, 474; 382/274, 318, 319; 399/367, 368, 207
See application file for complete search history.

(56) References Cited

U.S. PATENT DOCUMENTS 5,371,613 A 12/1994 Arimoto et al.
5,802,217 A 9/1998 Suzuki et al.

5,864,408 A * 1/1999 Kumashiro ............... 358/461

(Continued)

FOREIGN PATENT DOCUMENTS

JP 64-019865 1/1989

(Continued)

OTHER PUBLICATIONS

Japanese Office Action dated Jul. 14, 2008 for application No. 2003-128230.

(Continued)

*Primary Examiner*—Cheukfan Lee
(74) *Attorney, Agent, or Firm*—Rossi, Kimms & McDowell LLP

(57) ABSTRACT

An object of this invention is to suppress a decrease in reading efficiency while preventing image degradation. To achieve this object, an image reading apparatus includes a light source which illuminates an object, a sensor which photoelectrically converts light reflected by the object and reads information on the object, a first density reference member which serves as a reference for correcting an image signal obtained by reading an original by the sensor, a second density reference member which is different from the first density reference member, a comparison unit which compares the second signal obtained by reading the second density reference member by the sensor and the third signal obtained by reading again the second density reference member by the sensor, and a correction unit which corrects the image signal on the basis of the first signal obtained by reading the first density reference member by the sensor, and the comparison result of the comparison device.

7 Claims, 12 Drawing Sheets

U.S. PATENT DOCUMENTS

| | | |
|---|---|---|
| 6,151,419 A | 11/2000 | Aoki |
| 6,295,140 B1 | 9/2001 | Kameyama |
| 6,587,224 B1 | 7/2003 | Nabeshima et al. |
| 6,891,648 B2 | 5/2005 | Inoue et al. |
| 7,327,497 B2 * | 2/2008 | Sugeta et al. ............... 358/461 |
| 2003/0142367 A1 * | 7/2003 | Ito .............................. 358/461 |

FOREIGN PATENT DOCUMENTS

| | | |
|---|---|---|
| JP | 01-141461 | 6/1989 |
| JP | 02-070170 | 3/1990 |
| JP | 06-284284 | 10/1994 |
| JP | 08-009116 | 1/1996 |
| JP | 09-074465 | 3/1997 |
| JP | 10-108014 | 4/1998 |
| JP | 10-224571 | 8/1998 |
| JP | 10-224624 | 8/1998 |
| JP | 10-257313 | 9/1998 |
| JP | 2000-270172 | 9/2000 |
| JP | 2002-165074 | 6/2002 |
| JP | 2003-037717 | 2/2003 |
| JP | 2004-282166 | 10/2004 |

OTHER PUBLICATIONS

Office Action dated Sep. 3, 2007 of Japanese Patent Application No. 2003-128230. (JPA 2003-128230 claims domestic priority in Japan based on JPA 2002-139061 from which current application (i.e., U.S. Appl. No. 10/436,384) claims priority under 35 U.S.C. § 119).

* cited by examiner

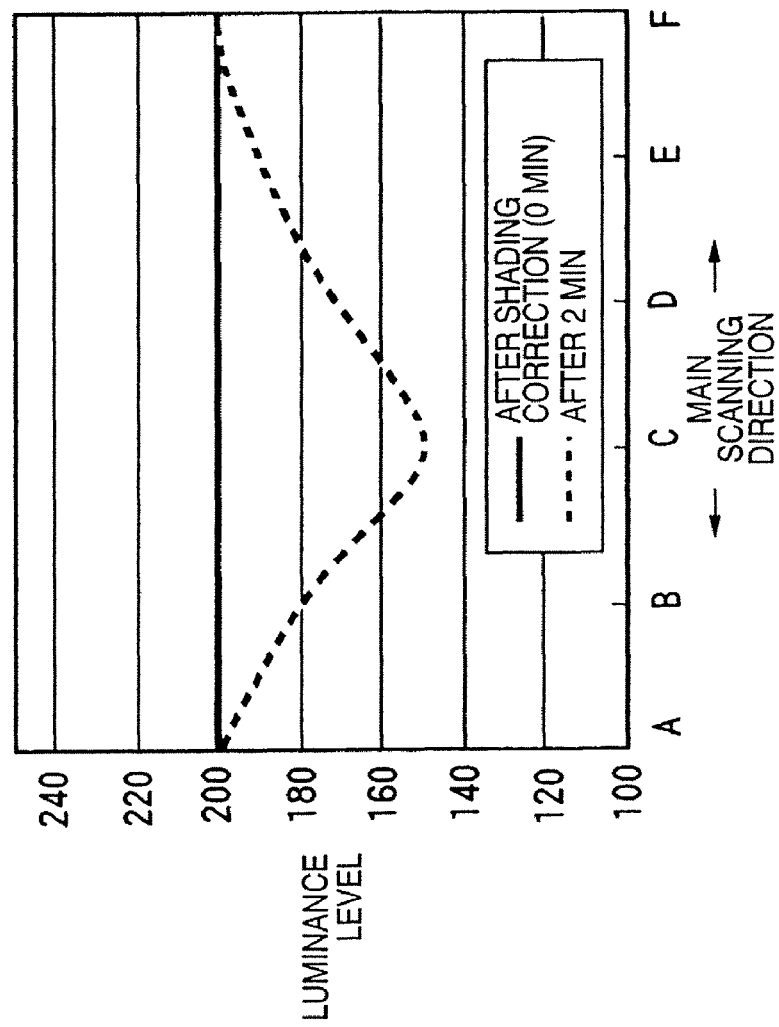

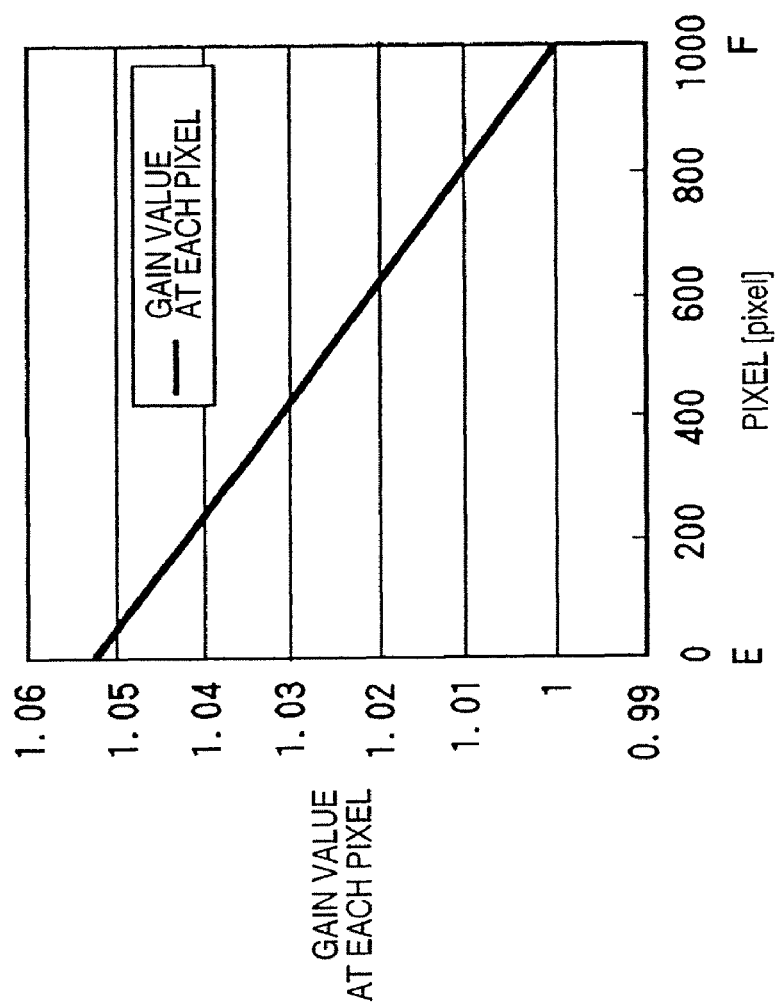

FIG. 9

| SAMPLING POINT | STEP S1 0 MIN | STEP S2 AFTER 2 MIN | STEP S3 DECREASE RATIO | STEP S4 GAIN | STEP S5 CALCULATION RESULT |
|---|---|---|---|---|---|
| A | 200 | 200 | 1.00 | 1.00 | 200 |
| B | 200 | 180 | 0.90 | 1.11 | 200 |
| C | 200 | 150 | 0.75 | 1.33 | 200 |
| D | 200 | 170 | 0.85 | 1.18 | 200 |
| E | 200 | 190 | 0.95 | 1.05 | 200 |
| F | 200 | 200 | 1.00 | 1.00 | 200 |

IMAGE READING APPARATUS, CONTROL METHOD THEREFOR, AND PROGRAM

This application is a continuation of U.S. patent application Ser. No. 10/436,384 filed May 12, 2003 now U.S. Pat. No. 7,327,497 under 35 U.S.C. §120, which claims priority to Japanese Patent Application No. 2002-139061 filed on May 14, 2002, the entirety of all of which are incorporated herein by reference as if fully set forth herein.

FIELD OF THE INVENTION

The present invention relates to an image reading technique in a copying machine, scanner, facsimile apparatus, and the like and, more particularly, to a technique of performing shading correction for the light quantity of a light source and variations in luminous intensity distribution in sequential reading of an original.

BACKGROUND OF THE INVENTION

In order to correct the light quantity of a light source and variations in luminous intensity distribution, a conventional image forming apparatus such as a copying machine, scanner, or facsimile apparatus moves an original to a white reference plate for each original or at a predetermined timing, reads the original, and performs shading correction every reading. Alternatively, an end white plate is prepared outside the image region, and monitored to perform correction on the basis of the variation amount.

In the conventional method, movement to the white reference plate at a predetermined timing greatly decreases the reading efficiency of a contact image sensor (to be referred to as a CIS hereinafter). In the use of the end white plate, the light quantity is monitored at an end portion in the main scanning direction. Variations in luminous intensity distribution in the entire main scanning region cannot be corrected, readily degrading the image.

SUMMARY OF THE INVENTION

The present invention has been made to overcome the conventional drawbacks, and has as its object to suppress a decrease in reading efficiency while preventing image degradation.

To solve the above problem and achieve the above object, according to the first aspect of the present invention, an image reading apparatus is comprising a light source which illuminates an object, a reading device which photoelectrically converts light reflected by the object and reads information on the object, a density reference member which serves as a reference for correcting an image signal obtained by reading an original by the reading device, a roller member which feeds the original to a reading position, a comparison device which compares a second signal obtained by reading the roller member by the reading device and a third signal obtained by reading again the roller member by the reading device, and a correction device which corrects the image signal on the basis of a first signal obtained by reading the density reference member by the reading device, and a comparison result of the comparison device.

According to the second aspect of the present invention, an image reading apparatus control method of controlling an image reading apparatus having a light source which illuminates an object, a reading device which photoelectrically converts light reflected by the object and reads information on the object, a density reference member which serves as a reference for correcting an image signal obtained by reading an original by the reading device, and a roller member which feeds the original to a reading position is comprising a first reading step of reading the density reference member by the reading device to generate a first signal, a second reading step of reading the roller member by the reading device to generate a second signal, a third reading step of reading again the roller member by the reading device to generate a third signal, a comparison step of comparing the second and third signals, and a correction step of correcting an image signal obtained by reading the original by the reading device on the basis of the first signal, and a comparison result in the comparison step.

According to the third aspect of the present invention, a program which causes a computer to execute an image reading apparatus control method of controlling an image reading apparatus having a light source which illuminates an object, a reading device which photoelectrically converts light reflected by the object and reads information on the object, a density reference member which serves as a reference for correcting an image signal obtained by reading an original by the reading device, and a roller member which feeds the original to a reading position is comprising a first reading step of reading the density reference member by the reading device to generate a first signal, a second reading step of reading the roller member by the reading device to generate a second signal, a third reading step of reading again the roller member by the reading device to generate a third signal, a comparison step of comparing the second and third signals, and a correction step of correcting an image signal obtained by reading the original by the reading device on the basis of the first signal, and a comparison result in the comparison step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7A is a graph showing the luminous intensity distribution when a platen roller is read;

FIG. 7B is a graph showing the gain value between sampling points;

FIG. 9 is a table showing an example of concrete numerical values when the luminous intensity distribution in FIG. 7A is corrected in accordance with the sequence in FIG. 8;

DETAILED DESCRIPTION OF THE PREFERRED EMBODIMENT

A preferred embodiment of the present invention will be described below with reference to the accompanying drawings.

Figure 1:
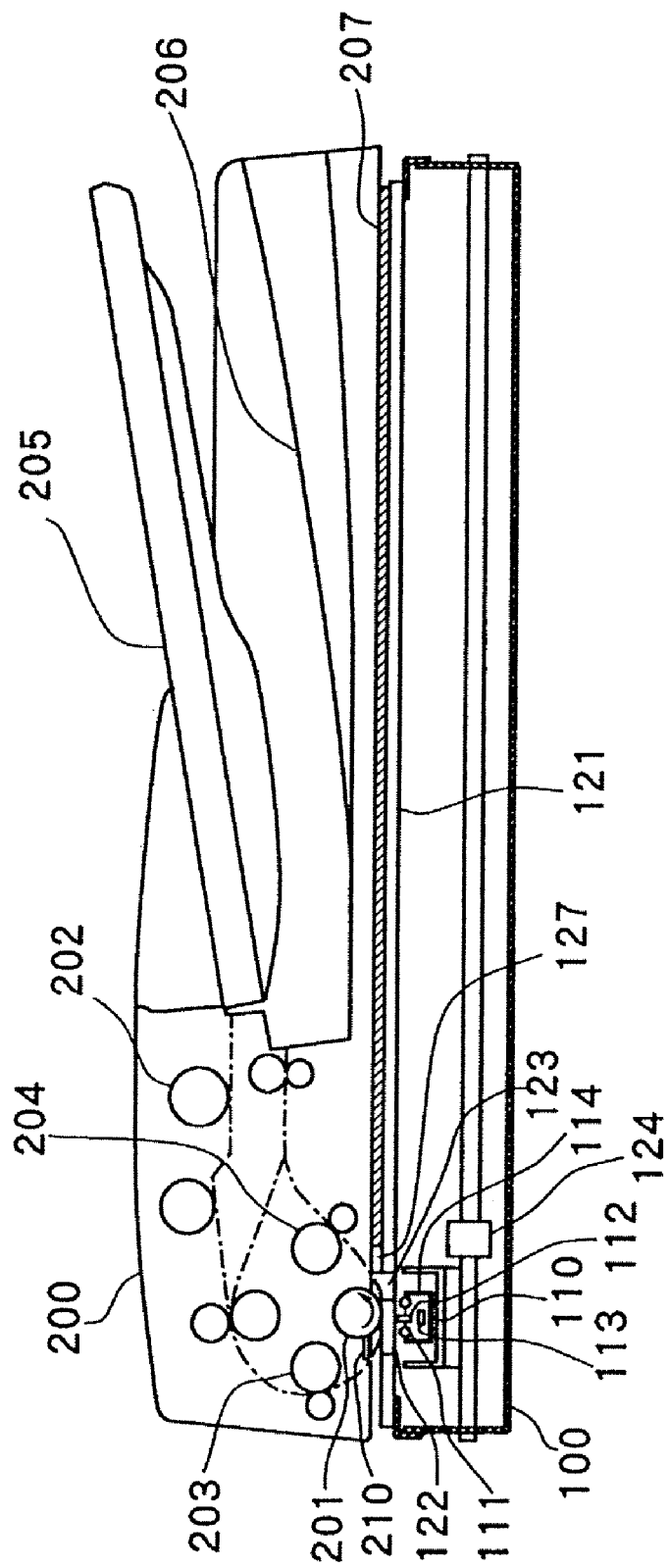
FIG. 1 is a sectional view showing the schematic arrangement of an image reading apparatus according to an embodiment of the present invention.
Figure 2:
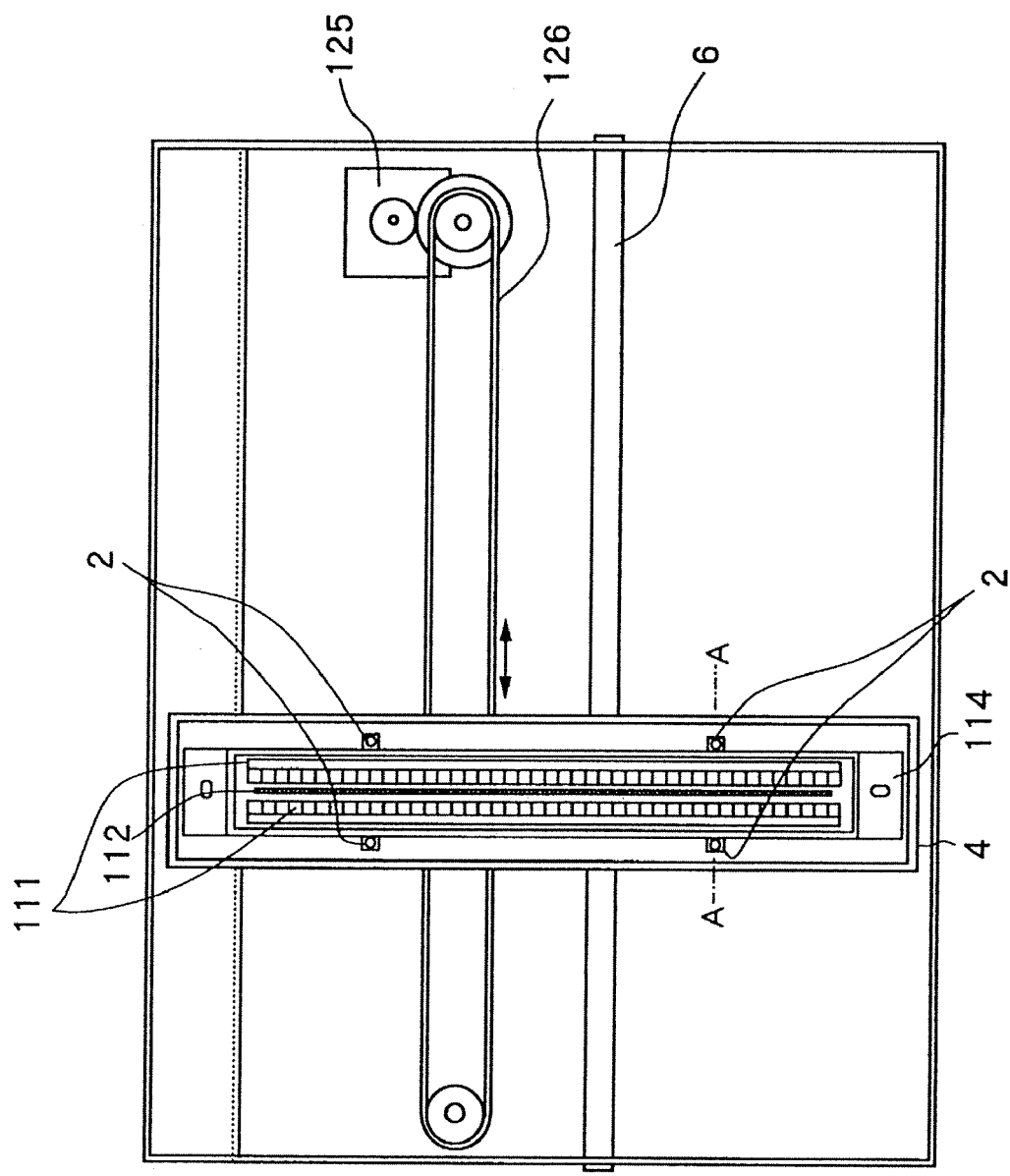
FIG. 2 is a plan view showing the image reading apparatus main body in FIG. 1 when viewed from the top.

FIG. 1 is a sectional view showing the schematic arrangement of an image reading apparatus according to the embodiment of the present invention. FIG. 2 is a plan view showing the image reading apparatus main body in FIG. 1 when viewed from the top.

In FIG. 1, the image reading apparatus comprises an image reading apparatus main body 100, and an ADF (Auto Document Feeder) 200 which is detachable from the image reading apparatus main body 100.

The ADF 200 conveys an original set on a feed tray 205 to a sheetfed scanning glass plate 122 of the image reading apparatus main body 100 by convey rollers 203 and 204, and then recovers the original. At this time, the original passes between a platen roller 201 attached to the ADF 200 and the sheetfed scanning glass plate 122 of the image reading apparatus main body 100. During the passage, the original is optically scanned by the image reading apparatus main body 100 to read original information.

More specifically, the image reading apparatus main body 100 has a contact image sensor (to be referred to as a CIS hereinafter) 110. The CIS 110 is constituted by integrally storing in a casing 114 a lamp 111 which emits light to the original surface, a lens 112 for guiding, to an image sensor 113, light reflected by the original that corresponds to light emitted by the lamp 111, and the image sensor 113 for photoelectrically converting light condensed by the lens 112.

The CIS 110 is connected to a motor 125 via a timing belt 126 in FIG. 2. By rotating and driving the motor 125, the CIS 110 moves parallel to a glass original table 121 and the sheetfed scanning glass plate 122. A position sensor 124 detects the home position of the CIS 110. The motor 125 is rotated in a normal or opposite direction on the basis of the position of the position sensor 124 serving as a reference. The CIS 110 then moves to optically scan an original on the glass original table 121 and sheetfed scanning glass plate 122.

The motor 125 is comprised of a stepping motor. The motor 125 is connected to an encoder 402 (see FIG. 4). An output from the encoder allows recognizing the number of pulses by which the CIS 110 has moved. In other words, the position of the CIS 110 can be grasped on the basis of a detection signal from the position sensor 124 and an encoder pulse from the encoder 402.

Light reflected by an original is guided to the SELFOC lens 112, and condensed on the image sensor 113. The image sensor 113 photoelectrically converts reflected light containing original information, and outputs an electronic image signal.

With this arrangement, original information can be read in two modes: an ADF original reading mode in which original information is read while the CIS 110 stops at an original reading position and an original is conveyed by the ADF 200, and a glass original table original reading mode in which original information is read while the original is stationarily set on the glass original table 121 and the CIS 110 is moved in a subscanning direction.

Figure 3:
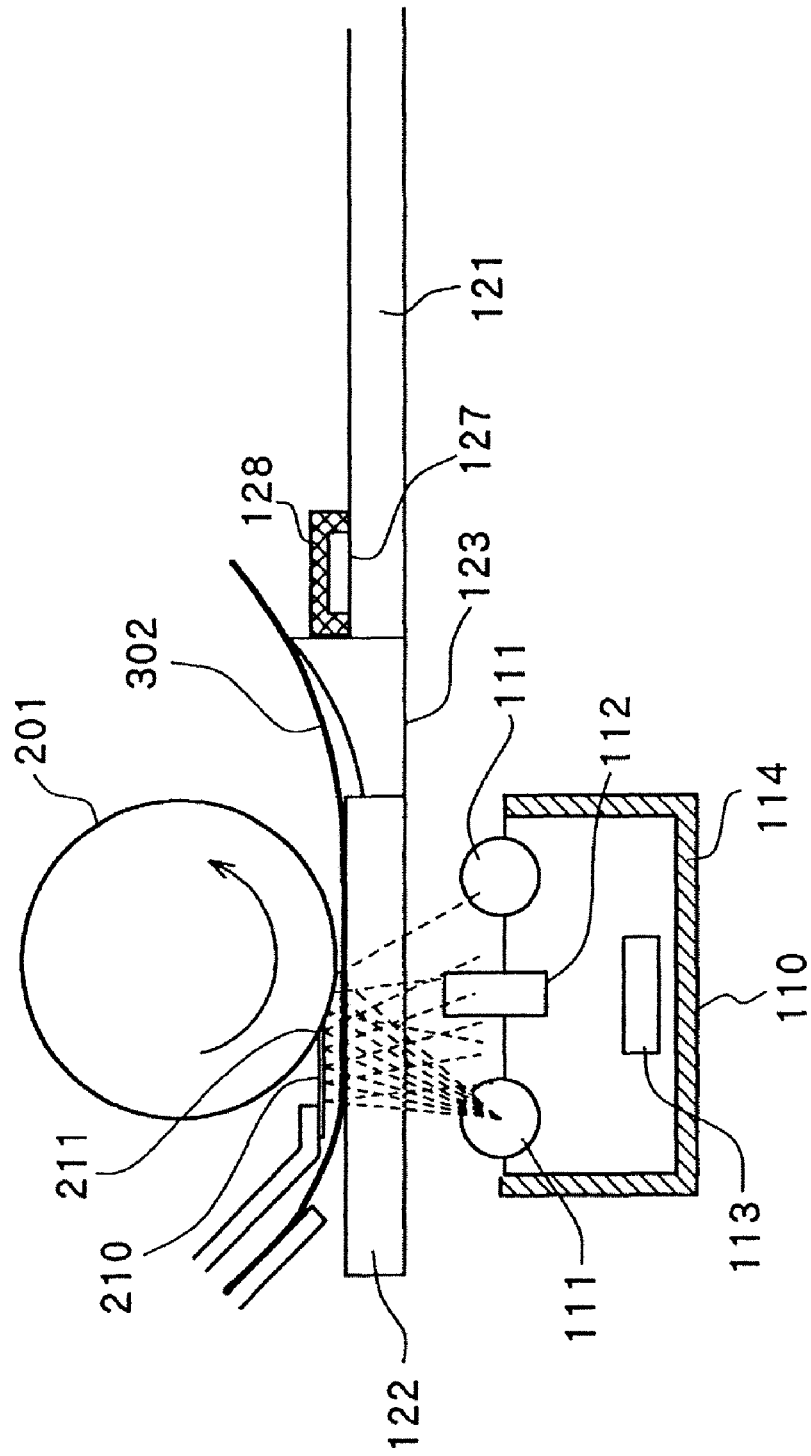
FIG. 3 is a sectional view showing in detail the sheetfed scanning unit of the image reading apparatus according to the embodiment.

FIG. 3 is a view showing an arrangement near the CIS 110 used in the embodiment. The ADF 200 of the embodiment comprises a white sheet member 210 on the upstream side of the platen roller 201 in the original convey direction. The white sheet member 210 is arranged almost parallel to the sheetfed scanning glass plate 122. A distal end position 211 where the white sheet member 210 comes closest to the platen roller 201 is set such that the white sheet member 210 covers part of the platen roller 201 in almost the entire image reading range of the CIS 110 in the main scanning direction when the platen roller 201 and white sheet member 210 are viewed from a lower portion in FIG. 3. The reading position of the CIS 110 in the ADF original reading mode is set to a position where the surface of the platen roller 201 is read when no original is conveyed. The glass original table 121 has a white reference plate 127. A jump table 123 has a mechanism which scoops, along the shape of the jump table, an original conveyed by the platen roller 201 and the like. The jump table 123 is effective for conveying a sheet.

Figure 4:
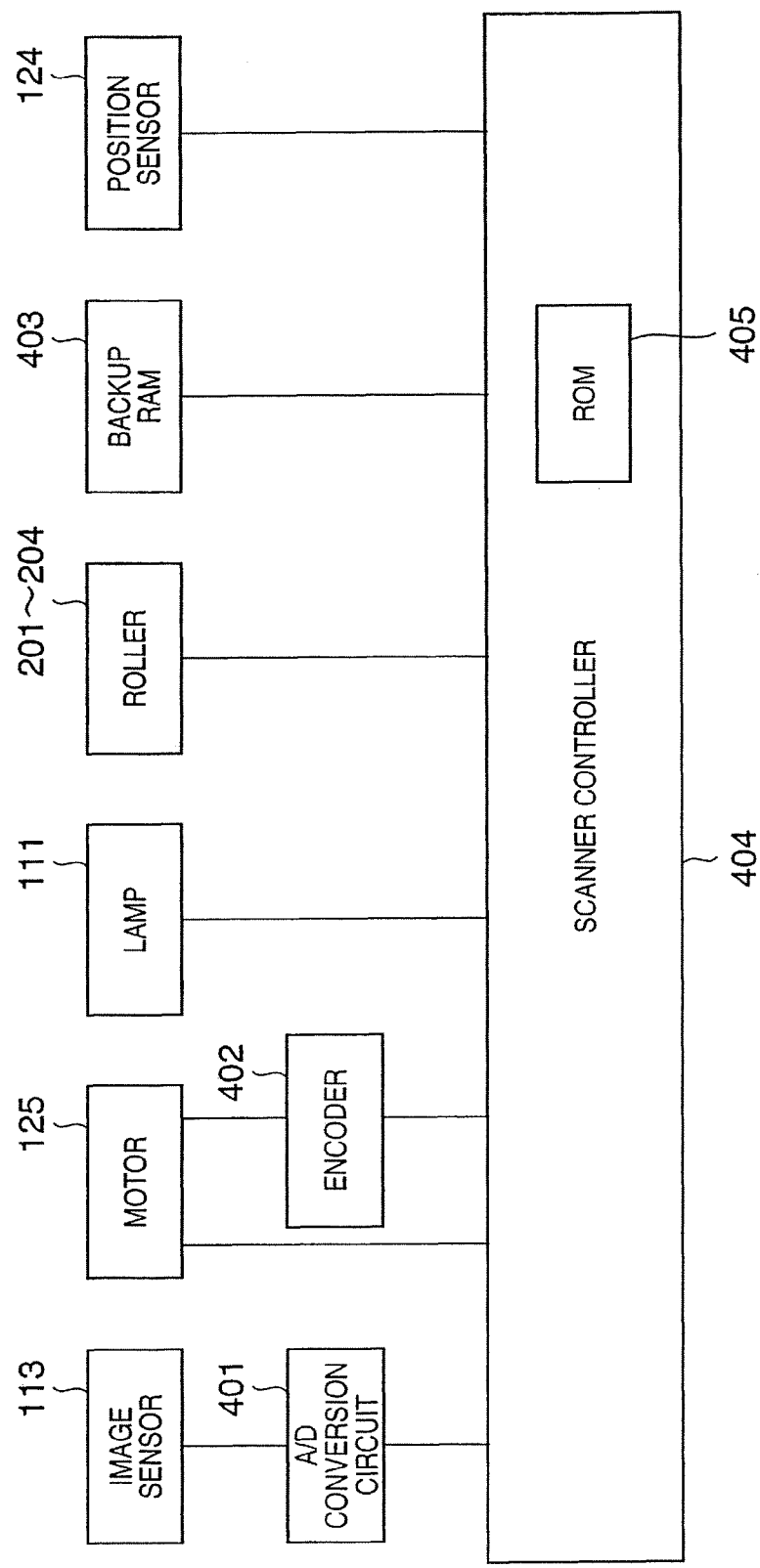
FIG. 4 is a block diagram showing the arrangement of the control system of the image reading apparatus in FIG. 1.

FIG. 4 is a block diagram showing the schematic arrangement of the control system of the image reading apparatus according to the embodiment.

In FIG. 4, the image reading apparatus comprises the platen roller 201, a feed roller 202, and the convey rollers 203 and 204 that convey an original, the lamp 111 which emits light to an original surface, the motor 125 which moves the CIS 110 in the subscanning direction to scan an original, the image sensor 113 which photoelectrically converts light reflected by an original surface, an A/D conversion circuit 401 which A/D-converts an output signal from the image sensor 113, an encoder 402 which is connected to the motor 125, the position sensor 124 for positioning the CIS 110 at the home position, a backup RAM 403 for setting a normal original reading position in the ADF original reading mode, and a scanner controller 404.

The scanner controller includes a ROM 405 which stores various programs such as a program corresponding to the flow charts of the following drawings.

Figure 5:
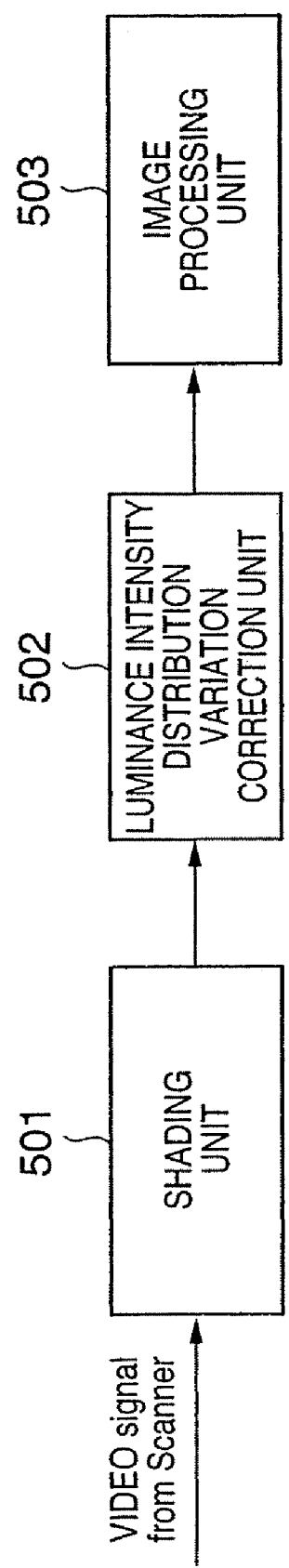
FIG. 5 is a block diagram showing the arrangement of the image processing unit of the image reading apparatus according to the embodiment.

FIG. 5 is a block diagram showing the arrangement of the image processing unit of the image reading apparatus according to the embodiment.

In FIG. 5, an image signal from the image sensor undergoes known shading correction by a shading correction unit 501, and undergoes, by a luminance intensity distribution variation correction unit 502, luminance intensity distribution variation correction which is a feature of the present invention and is to be described later.

Figure 6:
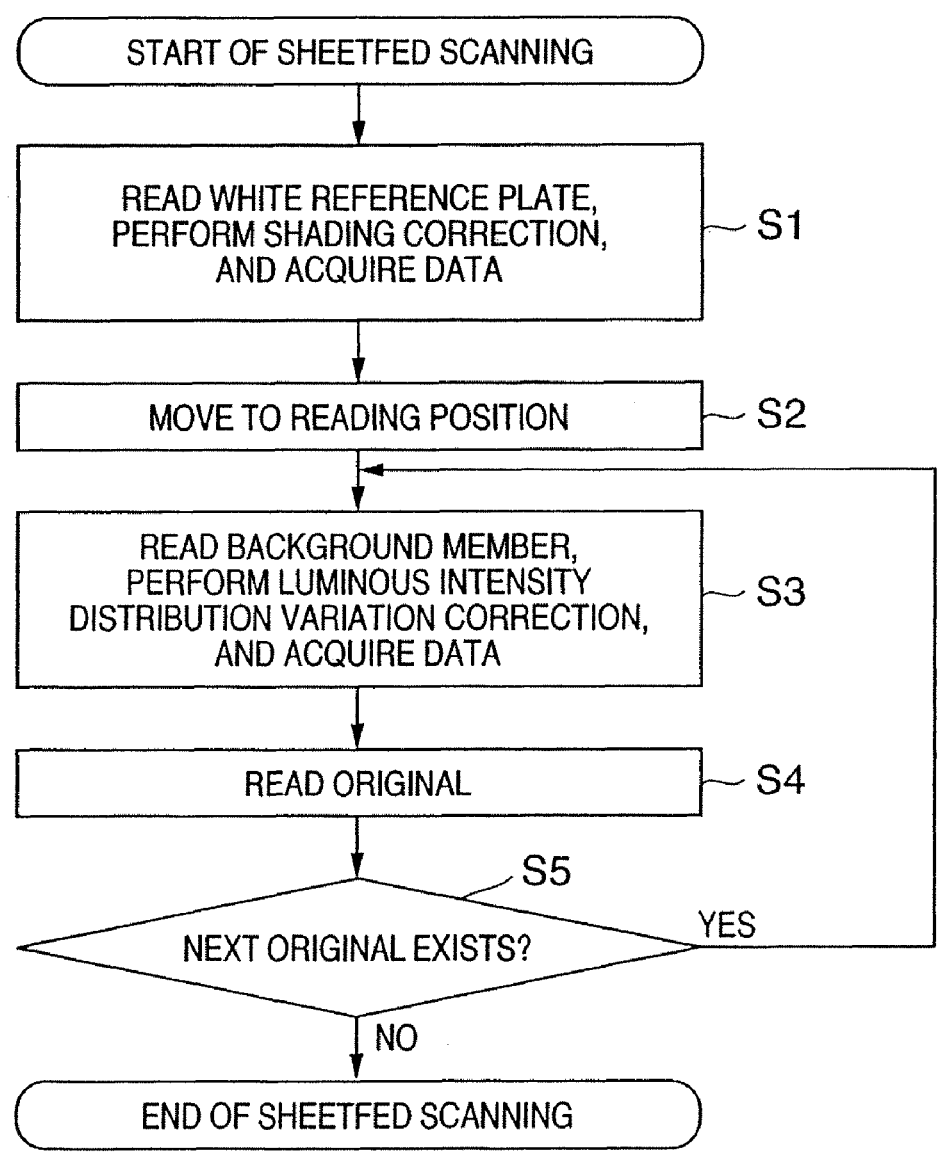
FIG. 6 is a flow chart showing the sheetfed scanning sequence of the image reading apparatus according to the embodiment.

FIG. 6 is a flow chart showing the sheetfed scanning sequence of the image reading apparatus according to the embodiment.

The CIS 110 reads the white reference plate 127 serving as a color density reference member at the home position, obtaining shading correction data (step S1). The CIS 110 moves below the jump table 123 to the reading position (step S2), and reads the background member (more specifically the surface of the platen roller 201), obtaining luminous intensity distribution variation correction data (step S3). After that, the CIS 110 reads an original (step S4). In the presence of the next original, the CIS 110 reads the background member again between originals (step S3), and reads the original. In the absence of the next original, the processing ends. Note that the white reference plate and background member (more specifically, platen roller) are different in density.

The platen roller can be read while being rotated, and the influence of contamination of the platen roller on reading can be reduced. Also, the mechanical arrangement of the platen roller allows conveying a sheet without fluttering it.

One of the reasons why the CIS 110 does not return to the white reference plate 127 after moving to the reading position in step S1 is as follows. If the CIS 110 moves to the home position in order to read the white reference plate 127 again after moving to the reading position, the CIS 110 must move below the jump table 123 again. To reduce restrictions on the return time, variation correction data is obtained in step S3. Since shading data is obtained in step S1, the data need not be acquired during reading as far as the arrangement considers changes along with sequential reading. This will be explained below. The luminance intensity distribution variation correction unit 502 will be described with reference to FIGS. 7A and 7B.

FIG. 7A is a graph showing the luminous intensity distribution in the main scanning direction when the platen roller 201 is read between originals.

The luminous intensity distribution is almost flat after shading correction (0 min), but varies after 2 min. Shading correction has conventionally been executed between originals. However, if the CIS arrangement is moved to the white reference plate 127 again, the reading efficiency greatly decreases. The gain may be applied uniformly in the main scanning direction by using an end white plate. This method cannot completely correct variations in luminance intensity when the light quantity decrease amount is different between the center and the end in the main scanning direction.

Figure 8:
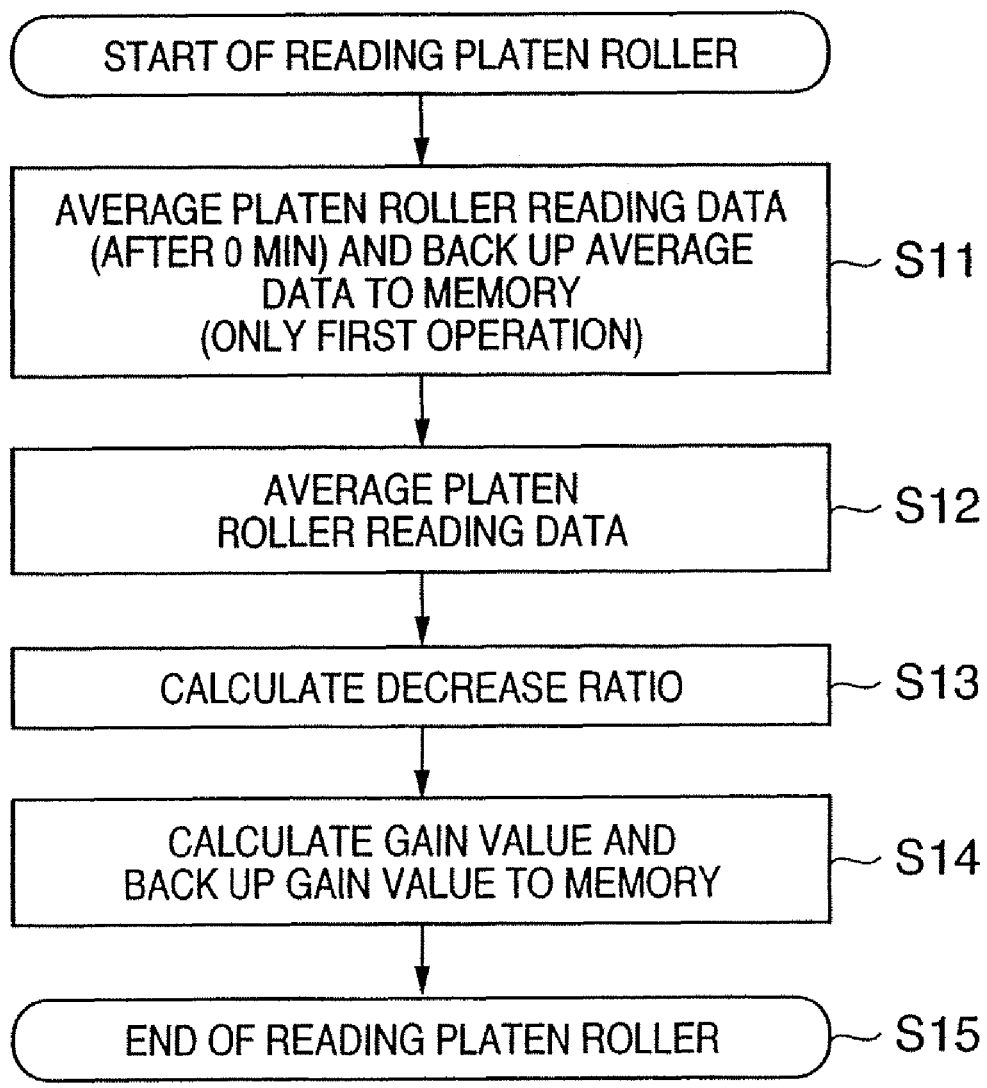
FIG. 8 is a flow chart showing an image processing sequence of reading the platen roller between sheets by the image reading apparatus according to the embodiment.

FIG. 8 is a flow chart showing operation of reading the platen roller 201 between originals by the image reading apparatus according to the embodiment.

If the platen roller 201 serving as a reference is read, m main scanning pixels and n subscanning pixels are sampled at a plurality of points in the main scanning direction, and data are averaged at each point (step S11). The data averaged in step S11 are backed up in a memory as the average luminance level of the reference platen roller 201. In reading a plurality of originals, m main scanning pixels and n subscanning pixels are sampled at a plurality of points by the same method as that in step S11 upon reading the platen roller 201 between originals, and data are averaged at each point (step S12). By using the average value calculated at each point, the decrease ratio is calculated (step S13):

Decrease ratio=(average luminance level of platen roller between originals)/(average luminance level of reference platen roller)

The gain value at each point is calculated from the decrease ratio (step S14):

Gain value=1/(decrease ratio)

FIG. 9 shows the concrete numerical values of FIGS. 7A and 7B along the flow chart.

As shown in FIG. 7B, the gain value between a plurality of points is obtained by approximating gain values at two points by a linear equation. The gain values of all pixels can be calculated by monotone increase or monotone decrease from gain values at two points without any special memory. Luminous intensity distribution variation correction calculation is executed using the data (step S15).

Luminous intensity distribution variation correction may be done between originals every time each original is read or for a predetermined number of originals. It is also possible to perform luminous intensity distribution variation correction at an early timing on an early stage with a relatively large lamp variation amount, and perform luminous intensity distribution variation correction at an interval when the light quantity of the lamp becomes stable upon the lapse of a predetermined time.

When the productivity increases (the number of originals read per unit time increases) in luminous intensity distribution variation correction for a predetermined number of originals, the time between originals becomes shorter, and the time used for calculation or the like also becomes shorter. Considering other processes between originals, a plurality of processes may fail between sheets. To prevent this, for example, process A is done between even-numbered sheets, and process B is done between odd-numbered sheets. This enables a plurality of control operations between sheets.

In luminous intensity distribution variation correction upon the lapse of a predetermined time, correction is done for each original till 60 sec immediately after the lamp is turned on because of a high decrease ratio. After the decrease ratio of the lamp becomes low over 60 sec, correction is done for a predetermined number of originals. This processing control can prevent wasteful calculation.

It is also possible to monitor the decrease ratio, and if a decrease equal to or larger than a threshold is detected, make luminous intensity distribution variation correction effective for subsequent originals. Also in this case, wasteful calculation at a low decrease ratio can be avoided, similar to correction upon the lapse of a predetermined time.

A larger number of sampling points (six points in the embodiment) to be averaged is effective because the luminous intensity distribution can be approximated at a higher precision. However, the luminous intensity distribution may be approximated even with a small number of sampling points depending on the lamp characteristic. The number of sampling points and sampling point positions can be changed. A decrease in the number of sampling points leads to an increase in processing speed and reduction in memory capacity. In the sampling point region, m main scanning pixels (256 pixels in the embodiment) and n subscanning pixels (64 pixels in the embodiment) are averaged to reduce the influence of roller contamination and the electrical noise component. When the sampling position is not contaminated, the noise component by contamination can be reduced by sampling m main scanning pixels.

Figure 10:
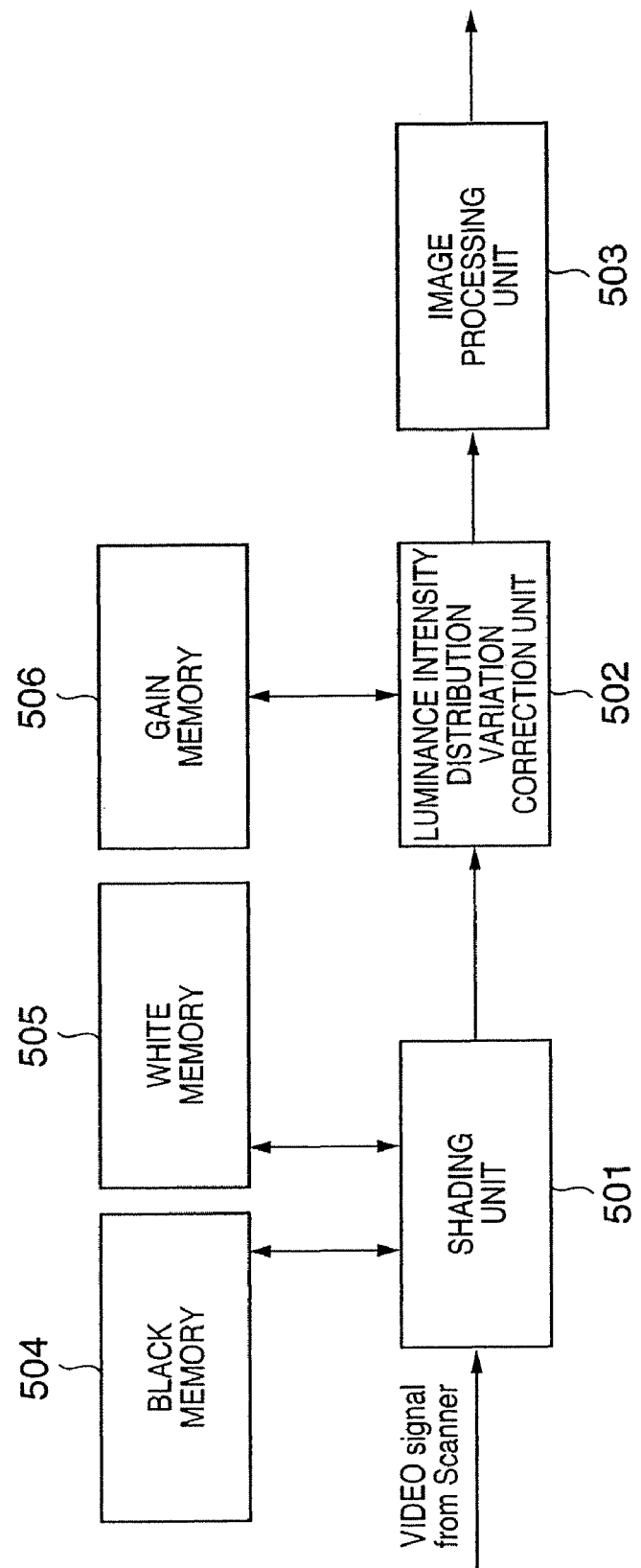
FIG. 10 is a block diagram showing the arrangement of the image processing unit of the image reading apparatus in FIG. 5 for explaining the relationship between a black memory 504, a white memory 505, and a gain memory 506.

The gain value by the luminance intensity distribution variation correction unit is stored in a memory different from that for the shading unit. These memories are illustrated in FIG. 10. FIG. 10 is a block diagram showing the arrangement of the image processing unit of the image reading apparatus in FIG. 5 according to the embodiment for explaining the relationship between a black memory 504, a white memory 505, and a gain memory 506.

Figure 11:
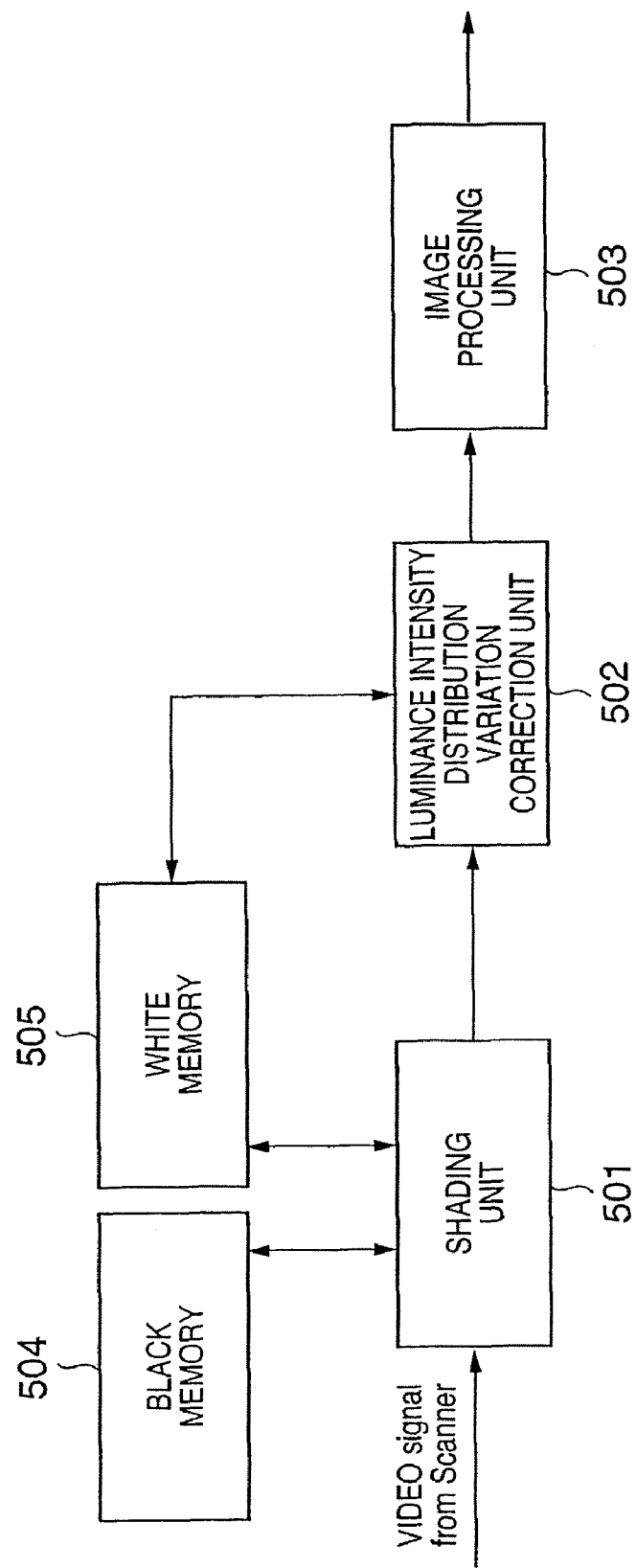
FIG. 11 is a block diagram showing a modification to FIG. 10.

The white reference plate 127 has a managed density and serves as a reference for an original to be read. That is, the shading correction gain value need not be rewritten. A value calculated by reading the white reference plate 127 serving as the first density reference member is held in the white memory 505, and a value calculated by the luminance intensity distribution variation correction unit is held in the gain memory 506. When the memory of the luminance intensity distribution variation correction unit cannot be ensured, the arrangement may be modified as follows. That is, as shown in FIG. 11, the gain value of the white memory 505 of the shading unit is rewritten into a gain value which considers luminous intensity distribution variation correction.

In this arrangement, proper shading data can be obtained without any temporal restrictions such that the CIS 110 moves below the jump table 123 during reading and reads again the white reference plate 127 serving as a color reference member. As a result, appropriate image reading can be achieved.

The luminance intensity distribution variation correction unit of the embodiment applies the gain to a read signal. For a controllable light source, the light quantity of the light source may be corrected.

As described above, according to the embodiment, the light quantity of the light source and variations in luminous intensity distribution can be corrected by reading the platen roller at the reading position between originals without decreasing the productivity. Degradation of the image quality by the light quantity and variations in luminous intensity distribution can be prevented.

Note that the surface of the platen roller 201 is read in the above embodiment, but the white sheet member 210 may be read. In this case, high productivity can be ensured because the distance is shorter in reading the white sheet member from the reading position than in reading the first density reference member.

Other Embodiment

The object of the embodiment is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described flow charts.

As has been described above, the present invention can suppress a decrease in reading efficiency while preventing image degradation.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
    a feeder adapted to feed an original through a reading position in a sub scanning direction;
    a light source adapted to illuminate an original fed through said reading position;
    a reading device that is movable, and adapted to read image on the original in a main scanning direction in a state said reading device is stationary during said feeder feeds the original through said reading position in said sub scanning direction;
    a first reference member which is provided at outside of said reading position;
    a second reference member which is provided at said reading position; and
    a correction device adapted to correct an image signal obtained by reading the original on the basis of a first signal obtained by reading said first reference member by said reading device and a second signal obtained by reading said second reference member by said reading device during the interval between two successive originals conveyed to the reading position by said feeder,
    wherein said correction device corrects the image signal based on said second signal at a plurality of points of said second reference member in said main scanning direction.

2. The apparatus according to claim 1, wherein said correction device corrects a gain of the image signal.

3. The apparatus according to claim 1, wherein said correction device corrects a luminous intensity distribution of said light source.

4. The apparatus according to claim 1, wherein said first reference member and said second reference member are different in density.

5. The apparatus according to claim 1, wherein said reading device has a plurality of photoelectric converters, and the second signal is output from predetermined photoelectric converters out of the plurality of photoelectric converters of said reading device.

6. The apparatus according to claim 1, wherein said correction device corrects the image signal based on said first signal, said second signal, and a third signal obtained by reading said second reference member by said reading device before conveying originals to the reading position by said feeder,
    and wherein said correction device corrects the image signal at each point in said main scanning direction based on said second and third signals at each point in said main scanning direction respectively.

7. The apparatus according to claim 1, wherein said correction device corrects the image signal in accordance with values obtained by linear approximation based on a plurality of said second signals at a plurality of points.

* * * * *